Patented Feb. 20, 1951

2,541,975

UNITED STATES PATENT OFFICE 2,541,975

COATING COMPOSITIONS FLATTED WITH SILICA AEROGEL

Arthur Raymond Bird, Denville, N. J., assignor to E. I. du Pont de Nemours & Company, Wilmington, Del., a corporation of Delaware No Drawing. Application July 30, 1948, Serial No. 41,713

9 Claims. (Cl. 260—21)

This invention relates to improvements in flatted coating compositions and, more particularly, to improvement in the settling and silking properties of urea formaldehyde resin coating compositions containing finely divided silica aerogel as the flatting agent.

In the formulation of protective and decorative finishes, it is desirable to vary the sheen over a wide range, and it is generally preferred to alter the sheen with a minimum alteration in the transparency of the clear finish. This may be accomplished by proper selection of flatting agents. The use of finely divided silica aerogel as a flatting agent is well known in the art of formulating flatted furniture finishes. The aerogels are generally replacing the polyvent metal soaps and waxes dispersed in organic film forming vehicles used to produce variations in gloss. The advantages of a finely divided inert silica aerogel which is insoluble in organic vehicles over the partially soluble flatting agents are readily perceived. Among the advantages are compositions which are manufactured uniformly to ultimately yield finishes which exhibit freedom from non-uniformity of appearance and freedom from hard settling of the flatting agent during storage of the liquid product. Such use of finely divided silica aerogel in flatted liquid coating compositions is claimed in U. S. Patent 2,180,145.

Although these compositions flatted with a silica aerogel show distinct advantages over compositions flatted with other types of agents, they exhibit an undesirable characteristic in the form of silking, flooding, and settling of the silica aerogel flatting agent.

It is an object of this invention to render an improvement in silica aerogel flatted compositions toward controlling silking, flooding, and settling of the flatting agent without alteration of the working properties of the product. Another object is the provision of modified urea formaldehyde resin coating compositions for production of flatted finishes exhibiting uniformity of quality not heretofore obtained by the use of either finely divided silica aerogel or other types of orthodox flatting agents.

These objects are accomplished by the addition of a small fractional percentage of an alcohol soluble N-substituted alkoxy polyamide in the form of an alcoholic solution to finely ground dispersions of a silica aerogel in a vehicle comprising a modified urea formaldehyde resin and a plasticizing alkyd resin.

It has been found that conventional wetting agents are unsatisfactory to solve the present problem of controlling the silking, flooding, and settling of the finely divided silica aerogel, but alcohol soluble N-substituted linear polyamines at concentrations of about 0.1% were found to be successful without adversely affecting the cure and other working properties as was evident in the case of wetting agents including triethanolamine which was satisfactory in some respects but reacted with the acid catalyst.

The alcohol soluble polyamides essential to this invention are linear polyamides in which an alkoxy group is attached to the nitrogen in the polymeric chain such that the functional group is represented as follows:

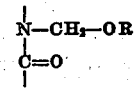

where R is an alkyl radical of not more than 6 carbon atoms. Particularly useful in this invention are the polyamides in which the side chain is a methoxy methyl group. The properties of these polymers vary with the degree of amide substitution and, although this may be chemically measured, it is more convenient to measure it equivalently by physical means in terms of dilution value which shall be designated as "DV." The "DV" increased with increased substitution and is the number of milliliters of acetone required to induce precipitation of the polyamide from a boiling solution of 1.00 gram of polyamide in 20 milliliters of 80% aqueous ethanol. The properties also vary with the composition of the parent polymer and in this invention the alcohol soluble polyamides refer to N-substituted derivatives of the parent linear polyamides derived from condensation of hexamethylenediamine with adipic acid and hexamethylenediamine with sebacic acid or hexamethylenediamine with the mixtures of the two acids.

The following examples illustrate the effective use of N-substituted alkoxy polyamides as suspension stabilizers for silica aerogels as flatting agents:

EXAMPLE 1

*Furniture coating composition flat*

| | Per cent |
|---|---|
| First portion: | |
| Resin A (solid) | 7.6 |
| Alkyd resin B solution (60% solids) | 17.9 |
| High solvency petroleum naphtha (130–190° C.) | 7.0 |
| Second portion: | |
| Urea formaldehyde resin C solution (60% solids) | 23.4 |
| Butyl alcohol | 7.0 |
| Blown castor oil | 1.5 |
| Polyamide solution A | 0.8 |
| Third portion: | |
| Silica aerogel dispersion A | 23.0 |
| High solvency petroleum naphtha (130–190° C.) | 11.8 |
| | 100.0 |

The first portion was mixed until the resin A was dissolved and then, as a second portion, the individual constituents were added directly to the first portion and mixed until uniform. Then the dispersion base was added to the combined first and second portions and mixed with the naphtha added last.

Polyamide solution A consisted of 90 parts by weight of denatured 95% ethyl alcohol 23A and 10 parts of hexamethylenediamine and adipic acid condensation polymer having a methoxymethyl group substituted on the nitrogen to the extent of about 50% to yield a DV (dilution value) of 80. The polyamide was dissolved in the alcohol at 65° C. but was used at room temperature. Silica aerogel dispersion of the following composition was ground in a pebble mill for a 12 hour cycle using a volume ratio of 2 parts of pebbles to 1 part of charged composition.

*Silica aerogel dispersion base A*

| | Per cent |
|---|---|
| First portion: | |
| Resin A (solid) | 5.4 |
| Alkyd resin B solution (60% solids) | 12.8 |
| High solvency petroleum naphtha (130–190° C.) | 26.1 |
| Second portion: | |
| Urea formaldehyde resin C solution (60% solids) | 16.7 |
| Butyl alcohol | 28.0 |
| Silica aerogel | 10.0 |
| Third portion: Polyamide solution A | 1.0 |
| | 100.0 |

The first portion was charged into the mill and mixed until the solid resin A was dissolved and then the components of the second portion were added to the mill and the combined mixture ground until smooth. Finally the polyamide solution was added to the mill and mixed until uniformly distributed before the charge was withdrawn from the mill.

Resin A is a solid hard, oil-free glyceryl phthalate alkyl resin modified with a dibasic acid and is characterized by a softening point in the range of 140 to 150° C. and an acid number in the range of 27 to 37.

Alkyd resin B is a plasticizing type 55% oil length castor oil modified glyceryl phthalate resin cut to 60% solids in a solvent mixture of 10 parts of butyl alcohol and 90 parts of high solvency petroleum naptha by weight. The resin is further characterized by an acid number in the range of 21 to 35. The high solvency petroleum naphtha used in the resin cut and in the formulation of the coating composition distills in the range of 130 to 190° C. and exhibits an aniline point of about 2° C., a specific gravity in the range of .830 and .845 at 25° C. and a flash point of 90° F. or higher.

The urea formaldehyde resin C is a butyl ether modified urea formaldehyde resin cut to 60% solids in butyl alcohol. This amide resin is low in viscosity and it polymerizes with adquate speed at either a low baking temperature associated with forced dry furniture finishing or even at air drying conditions. Resins of this type may be prepared as described in U. S. Patent 2,191,957. Instead of the butyl ether, other lower monohydric aliphatic alcohol ether modified urea formaldehyde resins shown in the patent may be substituted in the examples in like amount. The term lower alcohols include those having up to 5 carbon atoms.

The silica aerogel is a micro-fine incompletely dehydrated silicic acid which may be manufactured by the method disclosed in U. S. Patent 2,093,454. These aerogels are characterized by the following chemical constitution:

Silicon dioxide 89–92%, sodium sulfate 2.5 to 3.5%, aluminum and iron oxides about 1% and a volatile content, mainly water, in the range of about 4 to 7% by weight. The average particle size is in the range of 3 to 5 microns in diameter with about 1% of the material being retained by a 100 mesh screen.

The coating composition is ready to spray without reduction with thinner except for the addition of a catalytic accelerator for the modified urea formaldehyde resin. Phosphoric acid and acid phosphate esters such as derived from butyl and octyl alcohols are suitable accelerators. Although these acidic materials may be incorporated in the coating compositions, it is preferred to package the accelerator separately and add it immediately prior to use of the coating compositions to avoid deterioration during storage of the liquid material. Suitable accelerator compositions are used in the ratio of about one gallon to a 53 gallon drum of coating composition or equivalently about 2%.

The liquid coating composition was found to be free of hard cake settling of the silica aerogel flatting agent and was found to exhibit significant improvement in silking and flooding in comparison with the identical composition containing no additives to regulate these properties.

EXAMPLE 2

*Furniture coating composition—flat*

| | Per cent |
|---|---|
| First portion: | |
| Resin A (solid) | 4.4 |
| High solvency petroleum naphtha (130–190° C.) | 2.6 |
| Alkyd resin B solution (60% solids) | 12.7 |
| Second portion: | |
| Urea formaldehyde resin C solution (60% solids) | 16.5 |
| Butyl alcohol | 4.1 |
| Vinsol resin solution (50% solids) | 1.8 |
| Accelerator solution | 0.9 |
| Third portion: | |
| Silica aerogel dispersion A | 56.0 |
| Polyamide solution A | 1.0 |
| | 100.0 |

Mixing was performed as in the foregoing example where the solid resin A was first dissolved in solvent with the alkyd resin solution B and then the components of the second portion were individually added and mixed. Finally the silica aerogel dispersion was added and stabilized by the addition of the polyamide solution.

The accelerator solution constituted essentially butyl acid phosphate prepared by the reaction of phosphorous pentoxide and butyl alcohol and has an acid number in the range of 400 to 475. The amount specified is on the basis of 400 acid number and higher acidity material is added equivalently with additional butyl alcohol.

The following example represents the use of phosphorated castor oil which in addition to serving as a plasticizer supplements the accelerator:

EXAMPLE 3

| First portion: | Per cent |
|---|---|
| Resin A (solid) | 7.7 |
| High solvency petroleum naphtha (130–190° C.) | 7.8 |
| Alkyd resin B solution (60% solids) | 20.2 |
| Second portion: | |
| Urea formaldehyde resin C solution (60% solids) | 26.2 |
| Vinsol resin solution (50% solids) | 1.9 |
| N-butyl alcohol | 6.5 |
| Octyl alcohol | 1.5 |
| Phosphorated castor oil | 1.5 |
| Accelerator solution | 1.2 |
| Third portion: | |
| Silica aerogel dispersion A | 12.0 |
| Polyamide solution A | 0.9 |
| High solvency petroleum naphtha (130–190° C.) | 12.6 |
| | 100.0 |

"Vinsol" is the gasoline insoluble by-product of rosin manufacture, having a melting range of about 234° F. to 239° F., as described in U. S. Patent 2,114,393.

The phosphorated castor oil is a treated castor oil characterized by an acid number in the range of 135 to 150 and the accelerator solution was the same as specified in Example 2.

The finishes represented by the example compositions show a wide range in flatness or conversely gloss with the percentage range of silica aerogel based on the total composition indicated in the following tabulation, which also shows that the percentage concentration of suspension stabilizer is not proportional to the concentration of the silica aerogel:

| | Non-Volatile Vehicle | Silica Aerogel | Polyamide Suspension Stabilizer |
|---|---|---|---|
| | Per cent | Per cent | Per cent |
| Example 1 | 39.2 | 2.3 | 0.10 |
| Example 2 | 36.2 | 5.6 | 0.16 |
| Example 3 | 40.7 | 1.2 | 0.10 |

In the use of alcohol soluble N-substituted polyamides to stabilize urea-formaldehyde resin vehicles containing silica aerogel as a flatting agent against hard settling, silking, and flooding, it was found that less than 0.02% based on the total composition is relatively ineffective, and more than 0.30% offers no added protection over the preferred concentration in the range of about 0.05% to 0.25%. The effective concentration did not appear to be proportional to the concentration of the silica aerogel which may vary from about 0.2% to 7% and consequently one must assume that the behavior of these compounds is a complex function of solubility, viscosity, and perhaps polarity.

All the compositions include an alcohol soluble alkoxy substituted polyamide having 50% amide substitution and a "DV" of about 80. However, other polymeric condensates of hexamethylene diamine with adipic and sebacic acids with alkoxy substitution on the nitrogen ranging from 35 to 70% and a dilution value—"DV"—ranging from 55 to 150 may be used in the practice of this invention and substituted for those shown in the examples, but the polyamides ranging in "DV" from 70 to 120 are preferred.

It is also preferred to add the polyamide in the form of a 10% alcoholic solution, but other concentrations may be employed. A solution of the polyamide is preferred over the solid polymer because of the difficulty of uniformly distributing a small fractional percentage of material throughout a vehicle having very little solvency therefor.

The composition of the urea formaldehyde resinous vehicle may vary widely by substitutions of other resins and plasticizers to alter the characteristics of the ultimate finish. Particularly useful resinous vehicles are compositions within the scope of U. S. Patents 2,292,468 and 2,201,914. Although the examples relate to the use of vehicles containing butyl ether modified urea formaldehyde resin capable of catalytic cure under conditions of air-dry or low temperature bake, other vehicles containing modified urea formaldehyde resins and melamine resins requiring a higher temperature bake may be employed in the practice of this invention.

The most important and peculiar advantage characterizing the addition of a fractional percentage of alcohol soluble alkoxy substituted polyamides to coating compositions formulated with modified urea formaldehyde resins and coating silica aerogel as the flatting agent is the significant improvement in the settling, silking, and flooding properties without adversely affecting other working properties of the compositions. The alkoxy substituted polyamides in contrast to acidic and alkaline additives proposed to accomplish these objects are not reactive with accelerators introduced as curing agents for the urea formaldehyde resins or reactive with the resins to affect the cure or stability of the composition. The polyamide additive may be used in either the absence or presence of the acidic catalytic curing agent without its effectiveness being destroyed by the acid or the effectiveness of the curing agent being altered by the polyamide. The compositions containing the N-substituted polyamides constitute more foolproof products leading to greater uniformity in the appearance of the finishes as well as elimination of bad settling properties. The improvements described permit greater utility of silica aerogel in the protective and decorative finishes to take advantage of the superior characteristics of this inert type of flatting agent. The polyamides are film forming polymers and although present in the composition to the extent of a fractional percent, they form an integral part of the finish after their function is accomplished. Other non-film forming agents may be retained in the film and in general their retention may be detrimental.

It is apparent that many widely different embodiments of this invention can be made without departing from the spirit and scope thereof, and, therefore, it is not intended to be limited except as indicated in the appended claims.

I claim:

1. A non-settling, non-silking, and non-flooding coating composition comprising a lower aliphatic monohydric alcohol having up to 5 C atoms modified urea formaldehyde resin, from 0.2% to 7% of a silica aerogel, and from .02% to .30% of an alcohol soluble linear polymeric film-forming polyamide having recurring

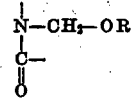

groups where R is an aliphatic radical of not more than six carbon atoms.

2. The composition of claim 1 in which the said polyamide has a dilution value of from 55 to 150.

3. The composition of claim 1 in which the said polyamide has a dilution value of from 70 to 120.

4. The composition of claim 1 in which the polyamide has an alkoxy substitution on the nitrogen of from 35% to 70%.

5. The composition of claim 1 in which the poyamide has an alkoxy substitution of 50% and a dilution value of 80.

6. The composition of claim 1 in which the parent linear polyamide of the N-alkoxy substituted alcohol soluble polyamide is a condensate of hexamethylene diamine and sebacic acid.

7. The composition of claim 1 in which the parent linear polyamide of the N-alkoxy substituted alcohol soluble polyamide is a condensate of hexamethylene diamine and adipic acid 8. A composition of matter having the following composition:

| | Per cent |
|---|---|
| Oil free alkyd resin | 7.6 |
| 55% castor oil modified alkyd resin in solution containing 60% solids | 17.9 |
| High solvency petroleum naphtha | 18.8 |
| Butyl alcohol modified urea formaldehyde resin in solution containing 60% solids | 23.4 |
| Butyl alcohol | 7.0 |
| Blown castor oil | 1.5 |
| n-Methoxy methyl substituted hexamethylene diamine adipic acid condensation product 10% alcohol solution | 0.8 |
| Dispersion containing 10% silica aerogel | 23.0 |
| | 100.0 |

9. The composition of claim 8 in which the silica aerogel dispersion has the following composition:

| | Per cent |
|---|---|
| Oil free alkyd resin | 5.4 |
| 55% castor oil modified alkyd resin in solution containing 60% solids | 12.8 |
| High solvency petroleum naphtha | 26.1 |
| Butyl alcohol modified urea formaldehyde resin in solution containing 60% solids | 16.7 |
| Butyl alcohol | 28.0 |
| Silica aerogel | 10.0 |
| 10% alcohol solution of a N-methoxy methyl substituted hexamethylene diamine adipic acid condensation product | 1.0 |
| | 100.0 |

ARTHUR RAYMOND BIRD.

REFERENCES CITED

The following references are of record in the file of this patent:

UNITED STATES PATENTS

| Number | Name | Date |
|---|---|---|
| 2,180,145 | Harford | Nov. 14, 1939 |
| 2,451,410 | Queeny | Oct. 12, 1948 |